United States Patent
Jorgensen et al.

(10) Patent No.: US 10,176,709 B2
(45) Date of Patent: Jan. 8, 2019

(54) OPTICAL GAS METER DISCONNECT

(71) Applicant: Honeywell International Inc., Morris Plains, NJ (US)

(72) Inventors: Joshua Jorgensen, Plattsmouth, NE (US); Albert Sauer, Raleigh, NC (US)

(73) Assignee: Honeywell International Inc., Morris Plains, NJ (US)

( * ) Notice: Subject to any disclaimer, the term of this patent is extended or adjusted under 35 U.S.C. 154(b) by 369 days.

(21) Appl. No.: 15/143,046

(22) Filed: Apr. 29, 2016

(65) Prior Publication Data

US 2016/0320763 A1 Nov. 3, 2016

Related U.S. Application Data

(60) Provisional application No. 62/155,026, filed on Apr. 30, 2015.

(51) Int. Cl.
*G05B 19/05* (2006.01)
*G08C 23/04* (2006.01)
*G08C 17/02* (2006.01)
*G01D 4/00* (2006.01)

(52) U.S. Cl.
CPC ............ *G08C 23/04* (2013.01); *G01D 4/002* (2013.01); *G08C 17/02* (2013.01)

(58) Field of Classification Search
None
See application file for complete search history.

(56) References Cited

U.S. PATENT DOCUMENTS

| 4,443,853 | A | * | 4/1984 | Maciolek | B64C 13/503 |
| | | | | | 244/17.13 |
| 5,553,505 | A | * | 9/1996 | Bignell | G01F 1/662 |
| | | | | | 73/861.27 |
| 5,811,675 | A | * | 9/1998 | Hamer | G07F 15/001 |
| | | | | | 222/14 |
| 6,035,725 | A | * | 3/2000 | Spendel | G07F 15/001 |
| | | | | | 73/861 |
| 2014/0129039 | A1 | * | 5/2014 | Olive-Chahinian | A01G 25/16 |
| | | | | | 700/284 |

OTHER PUBLICATIONS

'Operating instructions for operators and installers diaphragm gas meters BK..E', Elster GmbH, 2013.*
Zivic 'Actuality and Future of Optical Systems', International Journal on Computer Science and Engineering vol. 1(2), 2009, 62-70.*

* cited by examiner

*Primary Examiner* — Mohammad Ali
*Assistant Examiner* — Bernard G Lindsay

(57) ABSTRACT

A system and method are disclosed for remotely operating a shut-off valve of a gas meter. The gas meter includes a meter housing having a shut-off valve disposed within. An optical control system enables the shut-off valve to be operated with optical signals input to the meter.

10 Claims, 5 Drawing Sheets

OPTICAL GAS METER DISCONNECT

CROSS REFERENCE TO RELATED APPLICATION

The present application claims priority to and the benefit of U.S. Patent Application No. 62/155,026, "Optical Meter Disconnect" (filed Apr. 30, 2015), the entirety of which is incorporated herein for any and all purposes.

TECHNICAL FIELD

The present invention relates generally to metering systems, and, more particularly, to an apparatus and method for remotely disconnecting a gas meter.

BACKGROUND

Utilities today use gas metering devices to measure consumption of natural gas at metered locations, such as residential locations. A function that some gas metering devices provide is the ability to shut off the gas supply to a metered location using, for example, a shut-off valve. Some of these valves are remotely controlled and offer a utility the ability to disconnect the gas supply from a residence without visiting the site. This remote operational capability saves money and reduces manpower. For example, a utility may need to disconnect service when a subscriber moves out of a particular location and then later reconnect service to the same location when another subscriber moves in. Likewise, utility companies are sometimes forced to disconnect service to a subscriber who does not pay, and then reconnect service when the subscriber's account is settled. Gas metering devices currently exist that provide connect/disconnect capability through the use of shut-off valves internal to the meter.

Today, utilities often operate a wireless communication system in order to communicate with utility meters to obtain measured consumption information and to remotely control meter functions, such as remotely controlling a shut-off valve in a gas meter. Each meter in such a system is usually equipped with a radio (e.g., transceiver) that communicates in accordance with a communication protocol that is specific to the wireless communication system deployed by the utility. Consequently, the radio in a meter used by one utility may not work in the communication system of another utility.

SUMMARY

This disclosure relates to a system and method for operating a gas meter used to measure consumption of gas at a metered location, such as a residence. In one embodiment, a gas meter includes a shut-off valve, an optical input port, and an optical waveguide. The shut-off valve is disposed within a housing of the gas meter, the optical input port is disposed on and through an outside surface of the housing, and the optical waveguide is disposed within the housing. The shut-off valve includes a valve control coupled thereto for switching between a first valve position in which gas is not supplied through the meter and a second valve position in which gas is supplied through the meter. The optical waveguide has a first end and a second end. The first end is optically coupled to the optical input port, and the second end is optically coupled to the valve control. To operate the shut-off valve of the gas meter, optical signals are input through the optical input port and transmitted to the shut-off valve.

Another embodiment of the present disclosure provides a meter that comprises a housing, a shut-off valve, an optical input port, and an optical waveguide. The shut-off valve is disposed within the housing of the meter and includes a valve control coupled thereto for switching between a first valve position, in which gas is not supplied through the meter, and a second valve position in which gas is supplied through the meter. The optical input port is disposed on an outside surface of the housing. The optical waveguide is disposed within the housing. The optical waveguide includes a first end and a second end. The first end is optically coupled to the optical input port, and the second end is electrically coupled to the valve control. The optical signals may be input to the gas meter through the optical input port to operate the shut-off valve between the first valve position and the second valve position.

Another embodiment of the present disclosure provides a meter that comprises a shut-off valve, a valve control, an optical waveguide, and an optical input port. The shut-off valve has a first valve position in which gas is not supplied through the meter, and a second valve position in which gas is supplied through the meter. The valve control is coupled to the shut-off valve and is configured to operate the shut-off valve between the first valve position and the second valve position. The optical waveguide is coupled to the valve control. The optical waveguide is configured to convert optical signals into electrical signals. The optical input port is coupled to the optical waveguide. The optical input port is configured to receive optical signals. Optical signals are input to the gas meter through the optical input port to control the shut-off valve between a first valve position and a second valve position.

Another embodiment of the present disclosure provides a method for operating a meter. The method comprises receiving, by an optical input port, an optical signal, wherein the optical input port is positioned on an outside surface of the meter; transmitting, by an optical waveguide, the optical signal through the meter, wherein the optical waveguide is positioned within the meter; converting, by the optical waveguide, the optical signal into an electrical signal; and controlling, by a valve control, a shut-off valve between a first position and a second position based on the electrical signal, wherein in the first position gas is not supplied through the meter, and wherein in the second position gas is supplied through the meter.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Disclosed herein are methods and systems for operating a shut-off valve within a meter using optical signals. The meter may include an optical port connection on its outer housing that is configured to allow for a radio module to connect thereto. The radio module may receive signals for controlling the shut-off valve, which may then be converted to optical signals and optically transmitted from the radio module to a valve control within the meter to operate the shut-off valve.

Figure 1:
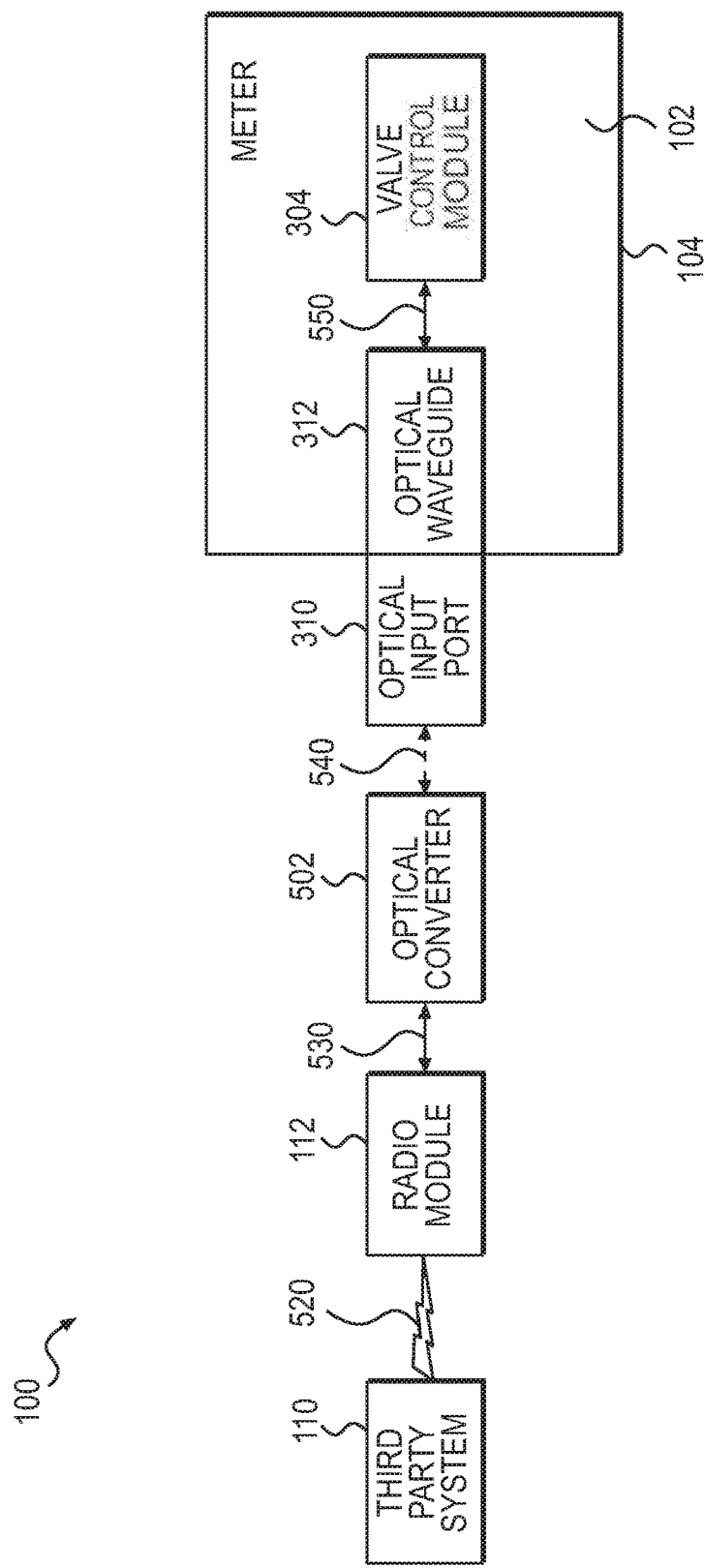
FIG. 1 illustrates an embodiment of an exemplary metering system in which a gas meter having an optical port as disclosed herein may be embodied.

FIG. 1 provides an operational flow diagram of one embodiment of a metering system 100 in which a meter 102 operates a shut-off valve using optical signals. The meter 102 may include a meter housing 104, a valve control module 304, a meter shut-off valve 308 (FIG. 3), and an optical waveguide 312 positioned within. The valve control module 304 may be coupled to the waveguide 312 and configured to operate the meter shut-off valve 308. The meter 102 may also include an optical input port 310 positioned on an outer surface of the valve housing 104.

In an embodiment, a third party utility metering system 110, such as an Advanced Metering Infrastructure (AMI) or Automated Meter Reading (AMR) system, is able to remotely communicate with the meter 102 through a radio module 112 coupled to the optical input port 310 via an optical converter 502. The optical converter 502 may be configured to convert remotely communicated signals received from the third party system 110 into optical signals which can be transmitted through the meter 102, via the optical input port 310 and optical waveguide 312, to control the shut-off valve 308. Converting the received signals into optical signals may advantageously avoid the introduction of electrical energy into the meter 102. The optical input port 310 may also receive optical signals directly and optically transmit them through the meter 102. That is, if the third party system 110 includes an optical transmitting/receiving device or the radio module 112 is capable of outputting optical signals, then such optical signals can be applied directly to the optical input port 310. The optical input port 310, the waveguide 312, and (optionally also) the optical converter 502 may function as a universal asynchronous receiver/transmitter (UART) in communicating with the valve control module 304. The communication protocol employed may comprise an open source protocol.

It will be appreciated that meter 102 may be operable to sense and record consumption or usage of natural gas at a metered location. Meter 102 may be located at customer premises such as, for example, a home or place of business. In one embodiment, meter 102 may include components for measuring the consumption of natural gas at the metered location and for generating data reflecting the consumption, as well as other data related thereto. Meter 102 may also comprise circuitry for wirelessly transmitting data generated by the meter 102 to a remote location. Meter 102 may further comprise circuitry for receiving data, commands or instructions wirelessly as well.

Figure 2:
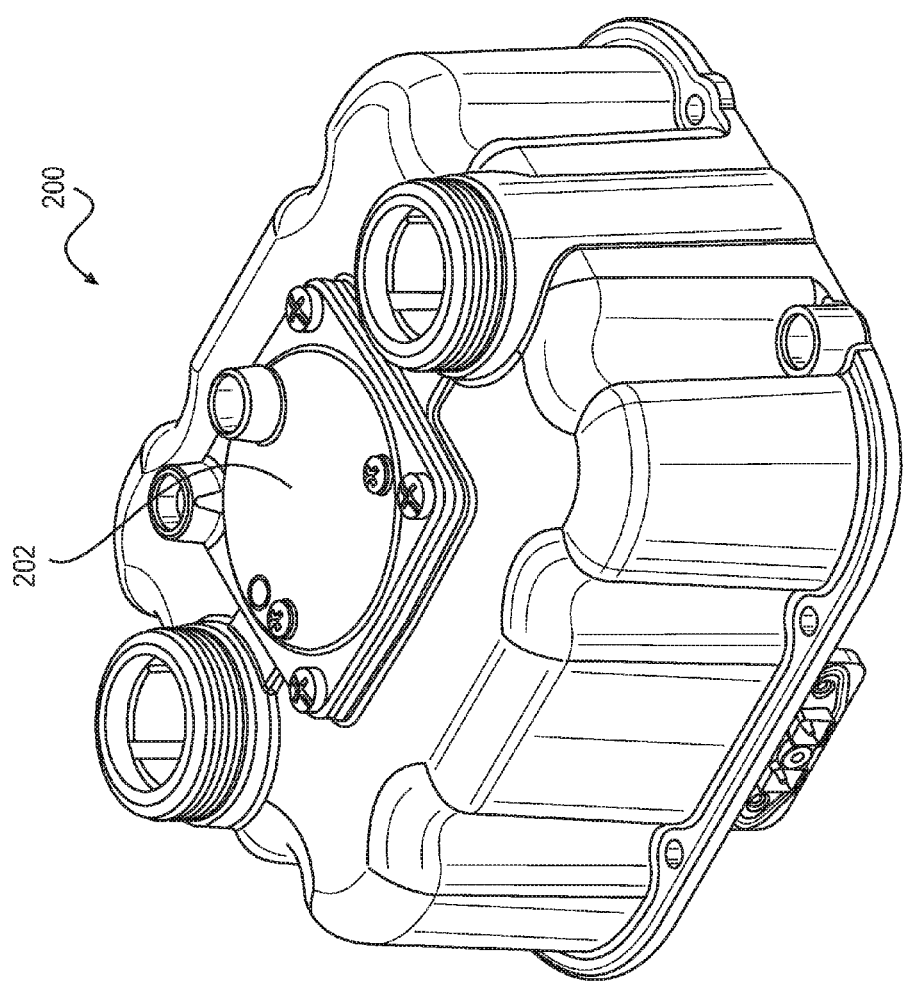
FIG. 2 is a perspective view of an upper housing of a gas meter having an optical port, according to an aspect of this disclosure.
Figure 3:
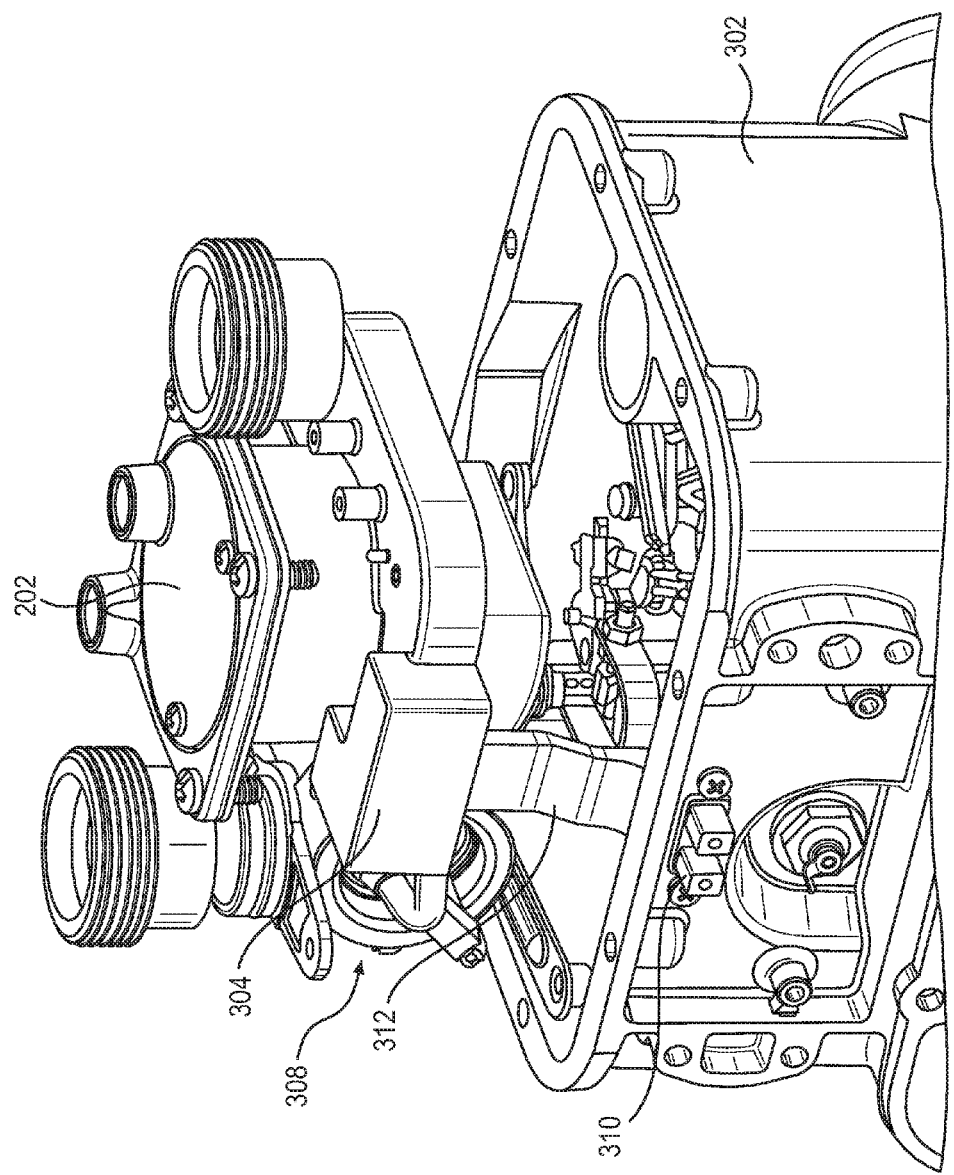
FIG. 3 is a cut-away perspective view of the gas meter of FIG. 2 showing the inside of the meter, according to an aspect of this disclosure.

FIG. 2 illustrates an exemplary upper housing 200 of a meter 102 configured to sense and record consumption or usage of gas, according to an aspect of this disclosure. The upper housing 200 is configured to cover and protect the internal components of the gas meter 102. The upper housing 200 may include a potting shell 202 used to house, for example, a battery (not shown) and fuse/resistor PC board (not shown). The potting shell 202 may hold the battery such that the battery is outside of the gas environment. The battery may be configured to provide power to various metering components within the housing, such as a valve control module 304 (FIG. 3). It will be appreciated that the potting shell 202 may be removable from the upper housing 200.

FIG. 3 is a cut-away view of the exemplary gas meter 102 in which the upper housing 200 has been removed to reveal a portion of the inside of the meter 102. As shown in this figure, the gas meter 102 comprises a lower housing 302, a valve control module 304, a gas shut-off valve 308, the optical input port 310, and the optical waveguide 312, among other meter components. The lower housing 302 is configured to couple to the upper housing 200 forming the complete meter housing 104 to contain the meter components within.

The valve control module 304 may be controlled by signals received by the optical input port 310 and transmitted through the optical waveguide 312. The valve control 304 may include electronic circuitry configured to convert the received signals into valve action to control the gas shut-off valve 308 between an open position and a closed position by applying a drive current to a motor (not shown) coupled to the shut-off valve 308. In the valve 308 open position, natural gas supplied by a source flows through the meter 102. In the valve 308 closed position, natural gas is prevented from flowing through the meter 102. The valve control 304 may also be configured to sense that the motor has reached a stop position, and determine whether the shut-off valve 308 has been properly opened or closed. If the motor stops prematurely, the valve control 308 may send an error message back to the radio module 112 via the UART (i.e., the waveguide 312, optical input port 310, and (optionally also) the optical converter 502). The valve control 308 may also be configured to respond to requests regarding, for example, battery status, number of valve cycles, current status, current temperature inside the meter 102, or other meter component diagnostic information.

In an embodiment, the optical input port 310 is disposed on an outside surface of the lower housing wall 302 and extends through an opening in the wall 302. The optical input port 310 is optically coupled to one end of the optical waveguide 312.

The optical waveguide 312 is disposed within the housing and provides two-way transmission of light signals to and from the valve control 304. A first end of the optical waveguide 312 is optically coupled to the optical input port 310. A second end of the optical waveguide 312 is electrically coupled to the valve control 304. Optical signals input to the optical input port 310 are transmitted through the optical waveguide to its second end, where the optical signals are converted to electrical signals that are then applied to the valve control 304 in order to operate the shut-off valve 308.

Figure 4:
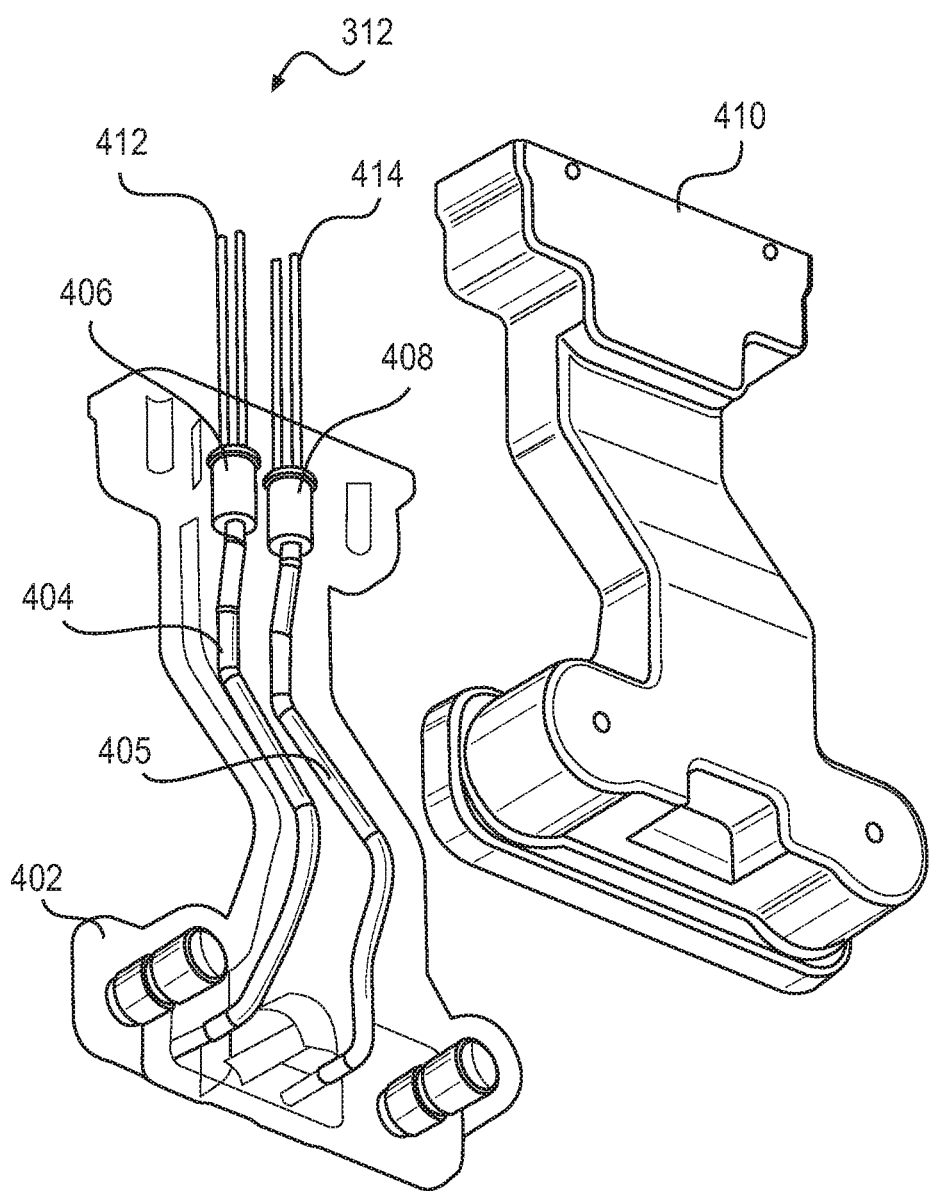
FIG. 4 is a perspective view illustrating further details of an optical waveguide of the gas meter of FIG. 3, according to an aspect of this disclosure.

FIG. 4 illustrates further details of one embodiment of the optical waveguide 312, according to an aspect of this disclosure. The optical waveguide 312 may include optically clear plastic 402, optical fibers 404 and 405, receive diode 406, transmit diode 408, and a protective cover 410. The optically clear plastic 402 may incorporate fiber optic retaining features. The optical fiber 404 is configured to transmit light signals received from the optical input port 310 to the receive diode 406. The receive diode 406 may convert the light signals into electrical signals, which are transmitted along wires 412 to the valve control 304. The transmit diode 408 may convert electrical signals received from the valve control 304 via wires 414, into light signals, and the optical fiber 405 is configured to transmit those light signals from the transmit diode 408 to the optical input port 310 where they may then exit the meter through the port 310. In an alternative embodiment, the receive diode 406 and transmit diode 408 may be switched, such that the receive diode 406 receives light signals from the optical input port 310 transmitted along optical fiber 405, and the light signals transmitted from the transmit diode 408 to the optical input port 310 are transmitted along optical fiber 404. In a further alternative embodiment, the optical waveguide 312 may include a single optical fiber configured for bi-directional communication between the optical input port 310 and the valve control 304. Each of the optical fibers 404 and 405 may comprise a plastic optical fiber (POF), or other suitable optical fiber materials may be employed, such as glass optical fibers or the like. The protective cover 410 may be overmolded in gasket material to protect the internal components from the gas environment. The overmold may be constructed out of a rubber-like material. In other embodiments, other suitable materials may be employed.

Figure 5:
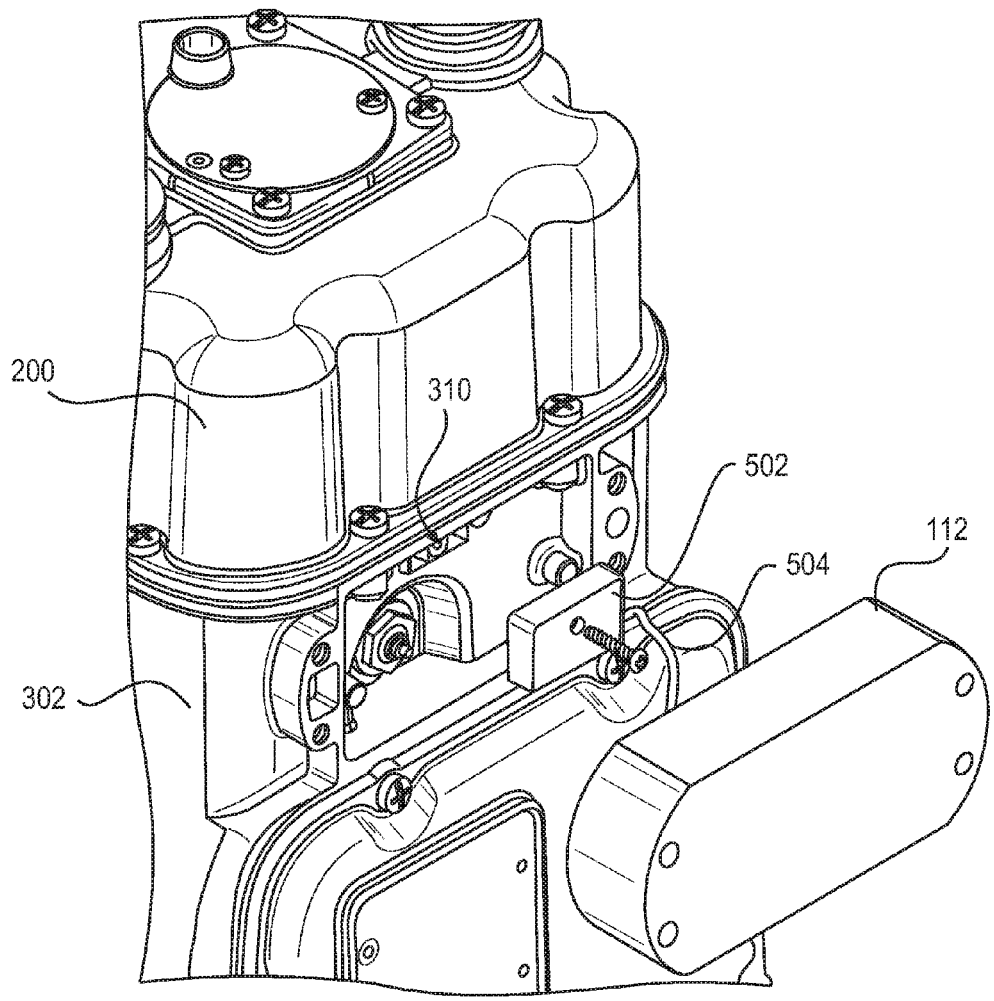
FIG. 5 illustrates an exterior of the gas meter shown in FIGS. 2 and 3, according to an aspect of this disclosure.

FIG. 5 illustrates an exterior of the gas meter 102 with the upper housing 200 coupled to the lower housing 302. The exterior of the gas meter 102 may include the optical converter 502, a conductor wire 504, and the radio module 112 coupled thereto. The optical converter 502 may be coupled to the radio module 112 via the conductor wire 504. In one embodiment, the conductor wire 504 may be a 4-conductor wire. Alternatively, the optical converter 502 may be directly coupled to a PC board of the radio module 112. The optical converter 502 may also be coupled to the optical input port 310.

Referring to FIGS. 1 and 5, the radio module 112 may receive RF signals 520 and output electrical signals 530 to the optical converter 502. The optical converter 502 may convert the electrical signals 530 received from the radio module 112 into optical signals 540. The optical signals 540 may be transmitted by the optical converter 502 to the optical input port 310, which transmits them through the optical waveguide 312. The waveguide 312 may convert the optical signals 540 into electrical signals 550, which are transmitted to the valve control 304. This configuration allows the external radio module 112 to be optically coupled to the optical input port 310. The radio module 112 may operate in accordance with a communication protocol of an existing automatic meter reading (AMR) and/or advanced metering infrastructure (AMI) system.

Many utilities have already installed RF AMR/AMI infrastructures that are used to provide meter reading functionality. These infrastructures vary in technology and generally consist of proprietary communication protocols. By providing the described optical input port 310 and optical waveguide 312, a utility can operate the shut-off valve 308 within the gas meter 102 without the need to install additional RF networks. That is, the optical input port 310 enables third party devices 110 to communicate with and control the operation of the shut-off valve 308, using existing RF networks.

This is important, because the internal components of the meter 102 are typically designed and reviewed for Hazardous Location safety requirements. If the optical input port 310 and the optical waveguide 312 were not provided, a utility would have to install its own RF communication module within the meter housing 200 in order to control the shut-off valve 308. That would then require the meter 102 to be recertified for Hazardous Location safety requirements. But because the optical input port and the optical waveguide 312 disclosed herein do not pass electrical energy into the meter 102, there is no need for additional Hazardous Location safety requirement certification.

While a limited number of embodiments are disclosed herein, these specific embodiments are for illustrative purposes and are not intended to limit the scope of the invention as otherwise described and claimed herein. Modification and variations from the described embodiments exist. The scope of the invention is defined by the appended claims.

What is claimed:

1. A meter comprising:
a housing;
a shut-off valve disposed within the housing of the meter, the shut-off valve including a valve control coupled thereto for switching between a first valve position in which gas is not supplied through the meter and a second valve position in which gas is supplied through the meter;
an optical input port disposed on an outside surface of the housing;
an optical waveguide disposed within the housing, the optical waveguide having a first end and a second end, the first end being optically coupled to the optical input port, and the second end being electrically coupled to the valve control, wherein the optical waveguide comprises a receive diode and a transmit diode, wherein the receive diode converts optical signals received from the optical input port into electrical signals, and wherein the transmit diode converts electrical signals received from the valve control into optical signals, wherein the optical waveguide further comprises a first optical fiber and a second optical fiber, wherein the first optical fiber is configured to transmit the optical signals from the first end to the second end of the optical waveguide, and wherein the second optical fiber is configured to transmit optical signals from the second end to the first end of the optical waveguide; and
an optical converter coupled to the optical input port, the optical converter configured to convert electrical signals to optical signals which are then applied to the optical input port,
wherein the optical signals are input to the meter through the optical input port to operate the shut-off valve between the first valve position and the second valve position.

2. The meter of claim 1, further comprising:
a radio module configured to receive RF signals and convert the RF signals to the electrical signals,
wherein the optical converter is coupled between the radio module and the optical input port.

3. A gas meter comprising:
a shut-off valve having a first valve position in which gas is not supplied through the meter, and a second valve position in which gas is supplied through the meter;
a valve control coupled to the shut-off valve, the valve control configured to operate the shut-off valve between the first valve position and the second valve position;
an optical input port configured to receive optical signals;

an optical waveguide coupled to the valve control and the optical input port, the optical waveguide configured to convert optical signals into electrical signals, the optical waveguide having a first end and a second end, wherein the optical waveguide comprises a receive diode and a transmit diode, wherein the receive diode converts optical signals received from the optical input port into electrical signals, and wherein the transmit diode converts electrical signals received from the valve control into optical signals, wherein the optical waveguide further comprises a first optical fiber and a second optical fiber, wherein the first optical fiber is configured to transmit the optical signals from the first end to the second end of the optical waveguide, and wherein the second optical fiber is configured to transmit optical signals from the second end to the first end of the optical waveguide;

and an optical converter coupled to the optical input port, wherein the optical converter is configured to convert electrical signals into optical signals, wherein optical signals are input to the gas meter through the optical input port to control the shut-off valve between a first valve position and a second valve position.

4. The gas meter of claim 3, further comprising a radio module coupled to the optical converter, wherein the radio module is configured to receive RF signals and output electrical signals to the optical converter.

5. The gas meter of claim 3, wherein the optical input port is disposed on an outside surface of the gas meter.

6. The gas meter of claim 5, wherein the optical waveguide is disposed within the gas meter, and wherein the optical waveguide includes a first end and a second end, the first end being optically coupled to the optical input port, and the second end being electrically coupled to the valve control.

7. The gas meter of claim 3, wherein the optical waveguide is further configured to convert electrical signals into optical signals.

8. A method for operating a meter comprising:

receiving, by an optical converter, an electrical signal;

converting, by the optical converter, the electrical signal into an optical signal;

receiving, by an optical input port of the meter, the optical signal, wherein the optical input port is positioned on an outside surface of the meter;

transmitting, by an optical waveguide, the optical signal through the meter, wherein the optical waveguide is positioned within the meter, the optical waveguide having a first end and a second end, wherein the optical waveguide comprises a receive diode and a transmit diode, wherein the receive diode converts optical signals received from the optical input port into electrical signals, and wherein the transmit diode converts electrical signals received from the valve control into optical signals, wherein the optical waveguide further comprises a first optical fiber and a second optical fiber, wherein the first optical fiber is configured to transmit the optical signals from the first end to the second end of the optical waveguide, and wherein the second optical fiber is configured to transmit optical signals from the second end to the first end of the optical waveguide;

converting, by the receive diode, the optical signal into an electrical signal; and controlling, by a valve control, a shut-off valve between a first position and a second position based on the electrical signal, wherein in the first position gas is not supplied through the meter, and wherein in the second position gas is supplied through the meter.

9. The method of claim 8, further comprising:

transmitting, by the optical converter, the optical signal to the optical input port.

10. The method of claim 8, further comprising:

prior to the receiving an electrical signal step, receiving, by a radio module, an RF signal; and outputting, by the radio module, an electrical signal to the optical converter.

* * * * *